US012756279B2

(12) United States Patent
Baek et al.

(10) Patent No.: US 12,756,279 B2
(45) Date of Patent: Oct. 6, 2026

(54) BLDC MOTOR CONTROLLER

(71) Applicant: Hanon Systems, Daejeon (KR)

(72) Inventors: Chung Jae Baek, Daejeon (KR); Byung Kuk Kim, Daejeon (KR); Sung Jun Park, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 250 days.

(21) Appl. No.: 18/728,724

(22) PCT Filed: Jan. 27, 2023

(86) PCT No.: PCT/KR2023/001304
§ 371 (c)(1),
(2) Date: Jul. 12, 2024

(87) PCT Pub. No.: WO2023/153689
PCT Pub. Date: Aug. 17, 2023

(65) Prior Publication Data

US 2025/0062665 A1 Feb. 20, 2025

(30) Foreign Application Priority Data

Feb. 8, 2022 (KR) ........................ 10-2022-0016069

(51) Int. Cl.
*H02K 11/40* (2016.01)
*H02K 11/33* (2016.01)
*F01P 5/04* (2006.01)

(52) U.S. Cl.
CPC ............. *H02K 11/40* (2016.01); *H02K 11/33* (2016.01); *F01P 2005/046* (2013.01); *H02K 2211/03* (2013.01); *H02K 2213/06* (2013.01)

(58) Field of Classification Search
CPC ......... H02P 6/08; H02P 29/024; H02K 11/40; H02K 11/33; H02K 11/30; H02K 2211/03; H02K 2213/06; F01P 5/10; F01P 5/04; F01P 7/08; F01P 2005/046
USPC ........................................................ 310/68 R
See application file for complete search history.

(56) References Cited

FOREIGN PATENT DOCUMENTS

| | | | | | |
|---|---|---|---|---|---|
| JP | H06141488 | A | | 5/1994 | |
| JP | 2009247066 | A | | 10/2009 | |
| JP | 2020162220 | A | | 10/2020 | |
| JP | 2021515517 | A | | 6/2021 | |
| JP | 2021106449 | A | * | 7/2021 | ........ H02M 7/53875 |
| KR | 20040051554 | A | | 6/2004 | |
| KR | 20190008609 | A | | 1/2019 | |
| KR | 20190034805 | A | | 4/2019 | |

(Continued)

OTHER PUBLICATIONS

Takamura et al., Circuit Board, Jul. 26, 2021, JP 2021106449 (English Machine Translation) (Year: 2021).*

(Continued)

*Primary Examiner* — Alexander A Singh
(74) *Attorney, Agent, or Firm* — NORTON ROSE FULBRIGHT US LLP

(57) ABSTRACT

The present invention relates to a BLDC motor controller for controlling a BLDC motor, and more particularly, to a BLDC motor controller that separates the ground of a battery power input line and the ground of an emergency operation signal line for an operation in an emergency operation mode, thereby preventing an abnormal operation in the emergency operation mode caused by noise.

9 Claims, 5 Drawing Sheets

(56) References Cited

FOREIGN PATENT DOCUMENTS

| | | | |
|---|---|---|---|
| KR | 20210087205 | | 7/2021 |
| KR | 20150108165 | A | 9/2025 |

OTHER PUBLICATIONS

International Search Report issued in PCT/KR2023/001304 on May 14, 2023.

Official Action issued Jan. 7, 2025 in related Korean Patent Application No. KR 10-2022-0016069, 5 pgs.

Notice of Allowance dated Aug. 13, 2025, during examination of related Korean Patent Application No. 10-2022-0016069.

* cited by examiner

BLDC MOTOR CONTROLLER

CROSS REFERENCE TO RELATED APPLICATIONS

This patent application is a national phase under 35 U.S.C. § 371 of International Patent Application No. PCT/KR2023/001304 filed Jan. 27, 2023, which claims the benefit of priority from Korean Patent Application No. 10-2022-0016069 filed Feb. 8, 2022, each of which is hereby incorporated herein by reference in its entirety for all purposes.

TECHNICAL FIELD

The present invention relates to a BLDC motor controller for controlling a BLDC motor, and more particularly, to a BLDC motor controller that separates the ground of a battery power input line and the ground of an emergency operation signal line for an operation in an emergency operation mode, thereby preventing an abnormal operation in the emergency operation mode caused by noise.

BACKGROUND ART

In general, a coolant is provided in a vehicle to lower a temperature of an engine. The coolant with a temperature raised by heat of the engine decreases in temperature while passing through a radiator, and the coolant circulates to cool the engine.

The radiator cools the coolant by using vehicle-induced wind introduced into the engine while the vehicle travels. A fan motor is mounted to rotate a fan to improve heat exchange efficiency when the vehicle is stationary.

A BLDC motor (brushless motor), which is applied to the fan motor, is operated by a control circuit for controlling a rotation direction and a speed. The control circuit includes an input filter circuit configured to transmit direct current power to the motor, and a motor drive circuit including several switching elements that supply power from the input filter circuit to the motor or cut off the supply of power. An embodiment in which the control circuit controls the motor will be described below.

With reference to Korean Patent Application Laid-Open No. 10-2004-0051554, as illustrated in FIG. 1, a motor control device in the related art includes a rectifier circuit 1, an inverter circuit 2, a brushless motor 3, a single-phase alternating current power source 5, and an inductor 17. The rectifier circuit 1 corresponds to an input filter circuit, and an inverter circuit 2 corresponds to a motor drive circuit.

In the motor control device, an emergency operation signal line is connected to a gate driver to rotate the fan in an emergency situation. In case that an engine control unit (ECU) of the vehicle does not generate a motor operation signal or the motor operation signal is not transmitted to a micro-control unit in a state in which the vehicle is turned on, the mode is switched to an emergency operation mode, such that the motor is operated by the emergency operation signal line.

Meanwhile, on the inverter circuit, a high-side MOSFET and a low-side MOSFET alternately perform switching operations, and noise signals, which occur during the switching operations, affect peripheral devices. In this case, because the emergency operation signal line is also a node like a battery power input line, the emergency operation signal line is also affected by the noise signal during the switching operation of the MOSFET that is a noise source. For this reason, even in the emergency operation mode, there may occur a problem in that the motor is not operated because of noise.

The emergency operation signal line is an essential element for operating the motor in an emergency situation and applies a signal directly to the microcontroller. Therefore, in case that the emergency operation signal line is vulnerable to the noise signal, there may occur an abnormal operation such as an operation in which the motor operates at a maximum rotational speed or the operation of the motor is stopped.

Accordingly, there is a need to develop a technology capable of preventing an erroneous operation of the emergency operation signal line by separating the ground of the emergency operation signal line and the ground of a switching source of the MOSFET.

DISCLOSURE

Technical Problem

The present invention has been made in an effort to solve the above-mentioned problem, and an object of the present invention is to provide a BLDC motor controller that separates a ground reference of an emergency operation signal line and a ground reference of a battery power input line.

Another object of the present invention is to provide a BLDC motor controller that uses a motor housing made of aluminum as a ground reference of an emergency operation signal line.

Still another object of the present invention is to provide a BLDC motor controller that connects a ground point on an emergency operation signal line on a circuit to a motor housing by means of a screw to ground the motor housing.

Technical Solution

An embodiment of the present invention provides a BLDC motor controller for a vehicle cooling fan, the BLDC motor controller including: a microcontroller unit configured to control a gate driver by receiving an operation signal through an operation signal line; a gate driver configured to turn on or off a MOSFET in response to the operation signal of the microcontroller unit and supply an electric current for operating the motor; the MOSFET configured to switch a drive current of the gate driver to the motor and transmit the drive current; a battery power input line configured to transmit battery power to the microcontroller unit, the gate driver, and the MOSFET when a vehicle is turned on; an operation signal line configured to transmit a motor operation signal, which is transmitted from an engine control unit of the vehicle, to the microcontroller unit; and an emergency operation signal line configured to operate the motor by transmitting an emergency operation signal directly to the gate driver when the motor operation signal is not transmitted to the microcontroller unit under a predetermined condition, in which the ground of the battery power input line and the ground of the emergency operation signal line are separated from each other.

In addition, the BLDC motor controller may include: a circuit board; and a motor housing to which the circuit board is fixed, in which the emergency operation signal line is grounded to the motor housing so as to have the ground separated from the ground of the battery power input line.

In addition, the circuit board may have a chassis ground part for grounding the emergency operation signal line, and the chassis ground part may be connected to the motor housing such that the emergency operation signal line is grounded to the motor housing.

In addition, the motor housing may have a board fixing portion for fixing the circuit board by bolting, the circuit board may have a board fixing hole for fixing the motor housing by bolting, the chassis ground part may be formed on a periphery of the board fixing hole, and the emergency operation signal line may be grounded to the motor housing when a screw bolt made of an electrically conductive material penetrates the board fixing hole and is fixed to the board fixing portion.

In addition, the board fixing portion may be provided as a plurality of board fixing portions spaced apart from one another, the board fixing hole may be provided as a plurality of board fixing holes spaced apart from one another, and the chassis ground part may be formed in the board fixing hole maximally spaced apart from the ground of the battery power input line among the board fixing holes.

As an another embodiment, the board fixing portion may be provided as a plurality of board fixing portions spaced apart from one another, the board fixing hole may be provided as a plurality of board fixing holes spaced apart from one another, and the chassis ground part may be formed in the board fixing hole maximally adjacent to the emergency operation signal line among the plurality of board fixing holes spaced apart from the ground of the battery power input line at a predetermined distance or more among the board fixing holes.

As still another embodiment, the BLDC motor controller may include: a circuit board; and a motor housing to which the circuit board is fixed, in which the battery power input line is grounded to the motor housing so as to have the ground separated from the ground of the emergency operation signal line.

In addition, the circuit board may have a chassis ground part for grounding the battery power input line, and the chassis ground part may be connected to the motor housing such that the battery power input line is grounded to the motor housing.

Further, the motor housing may have a board fixing portion for fixing the circuit board by bolting, the circuit board may have a board fixing hole for fixing the motor housing by bolting, the chassis ground part may be formed on a periphery of the board fixing hole, and the battery power input line may be grounded to the motor housing when a screw bolt made of an electrically conductive material penetrates the board fixing hole and is fixed to the board fixing portion.

Advantageous Effects

According to the BLDC motor controller of the present invention configured as described above, the ground reference of the emergency operation signal line and the ground reference of the battery power input line are separated, such that the influence of noise generated by MOSFET switching of the emergency operation signal line, which may minimize an erroneous operation during the operation in the emergency operation mode and improve the reliability of the controller.

In addition, the motor housing is used as the ground reference of the emergency operation signal line, and the emergency operation signal line is grounded to the motor housing through the screw for coupling the circuit board to the motor housing, such that a separate process of grounding the emergency operation signal line is not required, which may minimize the working process and improve the productivity.

DESCRIPTION OF REFERENCE NUMERALS

Figure 1:
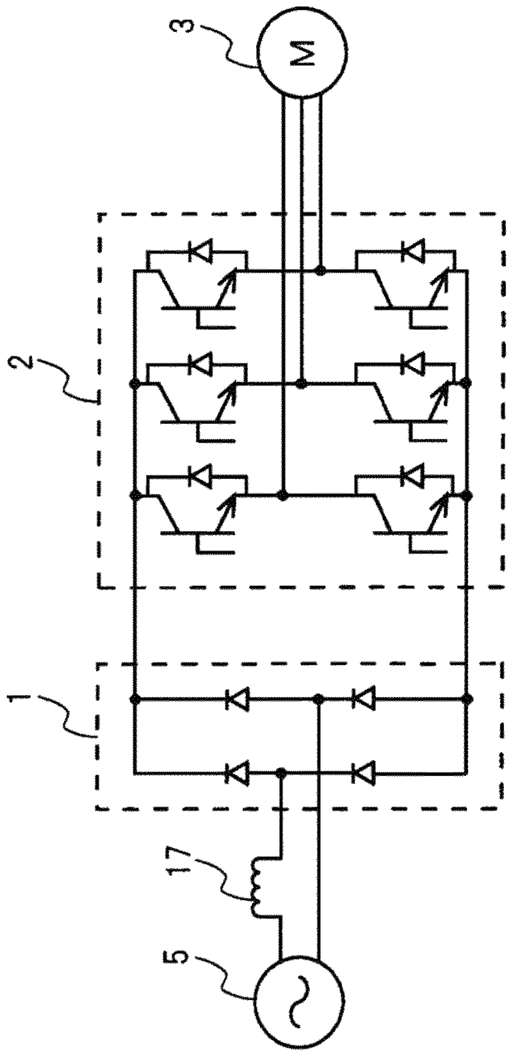
FIG. 1 is a circuit diagram of a motor controller in the related art.

1000: Motor controller
100: Microcontroller unit
110: First sensing part
120: Second sensing part
130: Operation signal part
200: Gate driver
210: Regulator
220: Operation signal level shifter
300: MOSFET
500: Motor
600, 610: Chassis ground part
800: Motor housing
810: Board fixing portion
900: Circuit board
910, 911, 912, 913: Board fixing hole
920: Screw bolt
L100: Battery power input line
L110: Battery power input line ground
L200: Operation signal line
L300: Emergency operation signal line

MODE FOR INVENTION

Hereinafter, the technical spirit of the present invention will be described in more detail using the accompanying drawings. In addition, terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Therefore, the embodiments disclosed in the present specification and the configurations illustrated in the drawings are just the best preferred embodiments of the present invention and do not represent all the technical spirit of the present invention. Accordingly, it should be appreciated that various modified examples capable of substituting the embodiments may be made at the time of filing the present application.

Hereinafter, the technical spirit of the present invention will be described in more detail using the accompanying drawings. The accompanying drawings are only exemplary embodiments illustrated to explain the technical spirit of the present invention in more detail, and the technical spirit of the present invention is not limited to the form of the accompanying drawings.

Hereinafter, the embodiments of the present invention will be described in detail with reference to the drawings.

Figure 2:
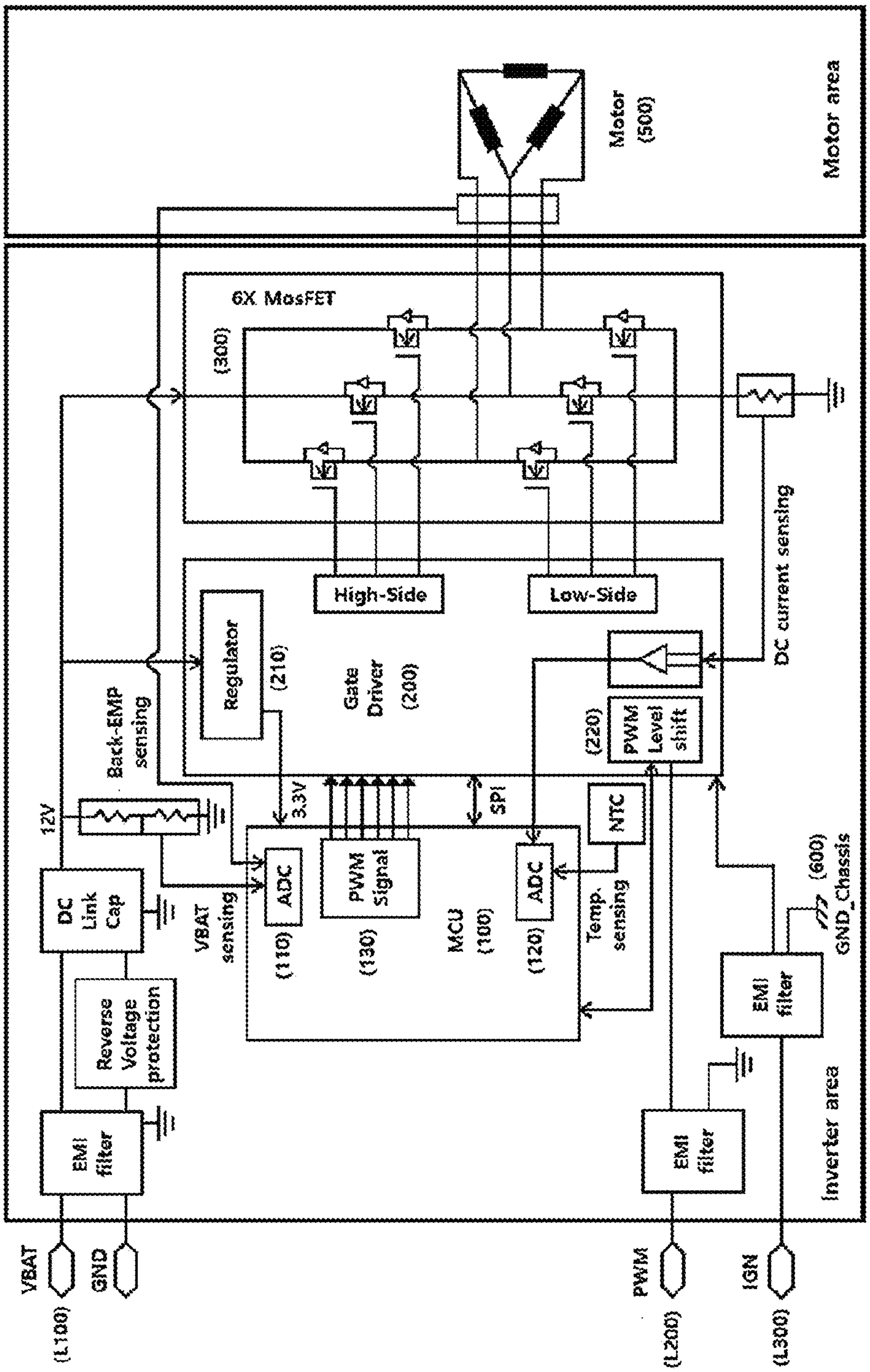
FIG. 2 is a circuit diagram of a motor controller according to an embodiment of the present invention.

FIG. 2 illustrates a circuit diagram of a motor controller 1000 according to an embodiment of the present invention. As illustrated, the motor controller 1000 includes a microcontroller unit (MCU) 100, a gate driver 200, and a MOSFET 300. In addition, the motor controller 1000 further includes a battery power input line (VBAT) L100, an operation signal line (PWM) L200, and an emergency operation signal line (IGN) L300.

The microcontroller unit 100 is a kind of computer made by integrating a microprocessor and an input/output module into a single chip and configured to perform predetermined functions. The microcontroller unit 100 includes a first sensing part (ADC) 110 configured to operate by receiving a voltage of 3.3 V, which is converted by a regulator 210 of the gate driver 200 and sense whether battery power is applied from the battery power input line L100, a second sensing part (ADC) 120 configured to sense a temperature and whether a direct current transmitted from the gate driver 200 is applied, and an operation signal part (PWM signal) 130 configured to transmit an operation signal to the gate driver 200.

The gate driver 200 is configured to change a voltage level to a voltage level that may turn on or off the MOSFET 300 in response to the operation signal of the microcontroller unit 100, and the gate driver 200 is configured to operate the MOSFET 300 by supplying the electric current. That is, the MOSFET 300 is turned on when 15 V is applied, and the MOSFET 300 is turned off when −8 V is applied. To this end, the gate driver 200 may include a separate power circuit and an electric current buffer to receive 12 V from the battery power input line L100 and supply 15 V or −8 V to the MOSFET 300. In addition, the gate driver 200 includes the regulator 210 configured to operate by receiving 12 V from the battery power input line L100 and supply a voltage of 3.3 V to the microcontroller unit 100. In addition, the gate driver 200 includes an operation signal level shifter 220 configured to shift an operation signal of the operation signal line L200 and transmit the operation signal to the microcontroller unit 100. Further, the gate driver 200 is configured to receive an emergency operation signal from the emergency operation signal line L300 and operate the MOSFET 300. Therefore, it is possible to operate the motor by means of the emergency operation signal line L300 without receiving the operation signal from the microcontroller unit 100. In addition, the gate driver 200 also serves to electrically insulate a signal between a high-pressure electric power circuit and a low-pressure control circuit and transmit the signal. Therefore, the gate driver 200 provides safer and high reliability to operate a semiconductor switch.

The MOSFET 300, which stands for metal-oxide semiconductor field effect transistor, is a kind of transistor. The MOSFET 300 serves as an electrical switch of the motor to switch a motor drive voltage of the gate driver 200 to a motor 500.

The battery power input line (VBAT) L100 is configured to supply 12 V power of the battery to the gate driver 200 and the MOSFET 300 when the vehicle is turned on.

The operation signal line L200 is configured to transmit a motor operation signal, which is transmitted from the engine control unit (ECU) of the vehicle, to the microcontroller unit 100.

In case that the motor operation signal is not transmitted to the microcontroller unit 100 from the engine control unit (ECU) even in the state in which the vehicle is turned on, the emergency operation signal line L300 transmits the emergency operation signal to the gate driver to operate the motor.

In this case, in case that the battery power input line L100 and the emergency operation signal line L300 use the same ground, noise, which occurs when the MOSFET 300 performs the switching operation, also affects the emergency operation signal line L300. In this case, an abnormal signal is transmitted to the gate driver 200 through the emergency operation signal line L300, which may cause a problem in that the motor 500 operates at a maximum rpm or the operation of the motor 500 is stopped during the operation in the emergency operation mode.

Therefore, the BLDC motor controller 1000 according to the embodiment of the present invention is characterized in that the ground of the battery power input line L100 and the ground of the emergency operation signal line L300 are separated from each other. To this end, the emergency operation signal line L300 and the battery power input line L100 may have separate grounds.

In a specific embodiment, the BLDC motor controller 1000 may have a chassis ground part 600 on the circuit board to ground the emergency operation signal line L300. In another embodiment, a chassis ground part 610 for grounding the battery power input line L100 may be formed on the circuit board.

In addition, the BLDC motor controller 1000 according to the embodiment of the present invention has the following configuration to use the motor housing made of aluminum as the ground reference of the emergency operation signal line L300 or the battery power input line L100.

Figure 3:
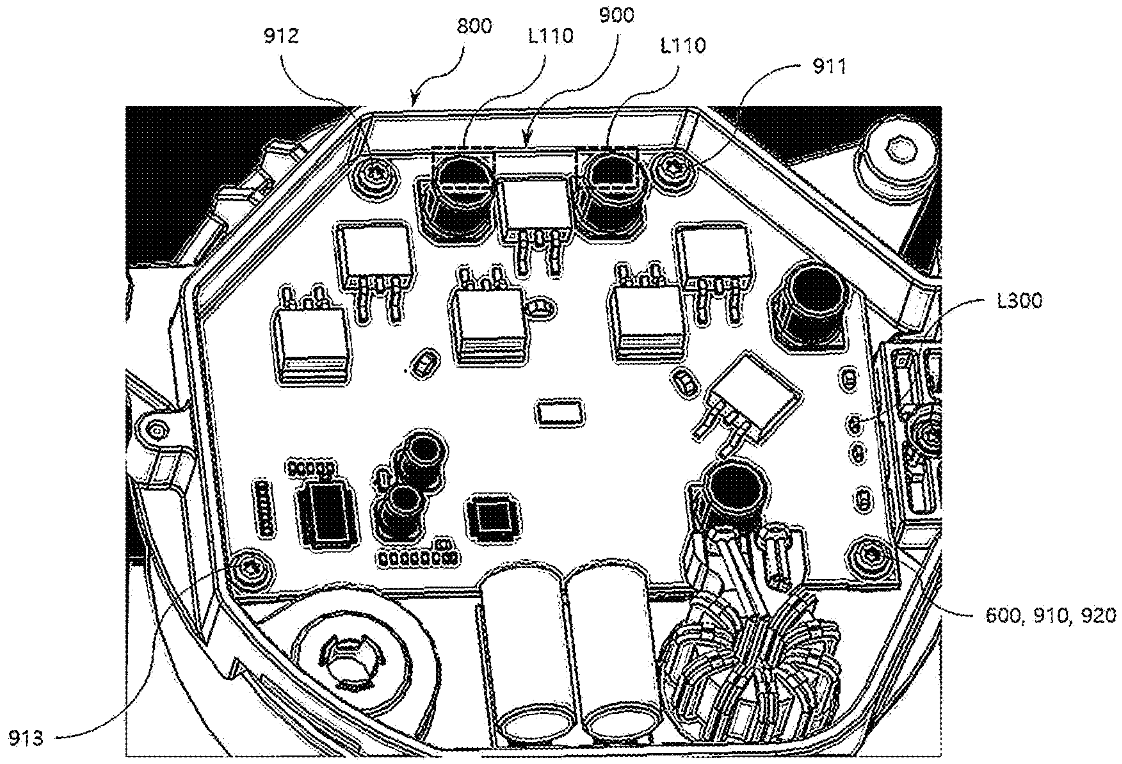
FIG. 3 is a top plan view of a circuit board of a motor controller according to a first embodiment of the present invention.
Figure 4:
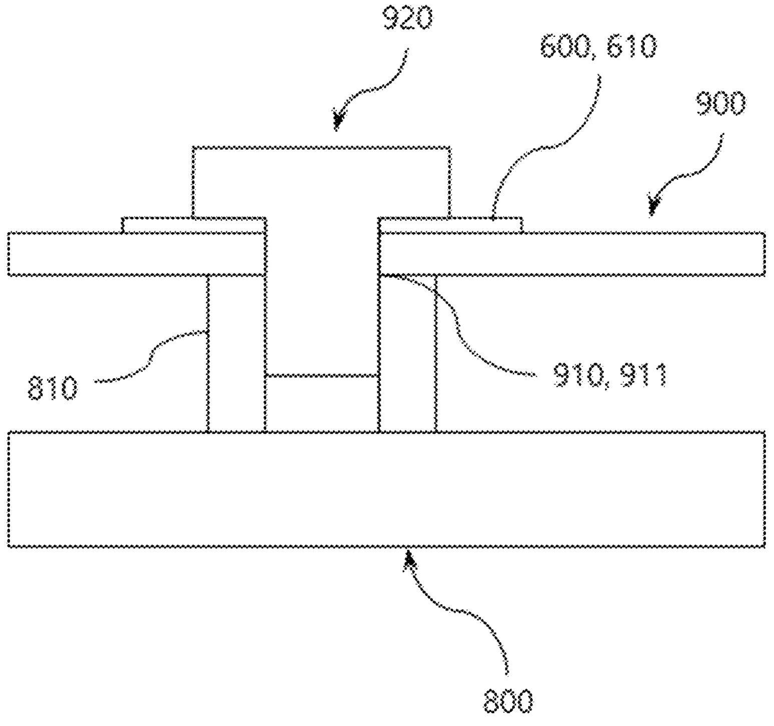
FIG. 4 is a cross-sectional schematic view illustrating a state in which a motor housing and a circuit board of the motor controller according to the embodiment of the present invention are fixed.

FIG. 3 is a top plan view illustrating the circuit board of the motor controller 1000 according to the first embodiment of the present invention. In addition, FIG. 4 is a cross-sectional schematic view illustrating a state in which a motor housing 800 and a circuit board 900 of the motor controller 1000 according to the embodiment of the present invention are fixed.

As illustrated, the motor controller 1000 includes board fixing holes 910 formed in the circuit board 900 to fix the circuit board 900 to a board fixing portion 810 of the motor housing 800. In this case, the chassis ground part 600 may be formed on a periphery of the board fixing hole 910, and a screw bolt 920 penetrates the board fixing hole 910. When the circuit board is fixed to the board fixing portion 810 of the motor housing 800, the emergency operation signal line L300 may be grounded to the motor housing 800 through the screw bolt 920. Therefore, the screw bolt 920 is made of an electrically conductive material.

In addition, a plurality of board fixing holes 910, 911, 912, and 913 may be disposed in the circuit board 900 and spaced apart from one another. In this case, the chassis ground part 600 may be formed in the board fixing hole 910 physically farthest from a ground L110 of the battery power input line L100. That is, as illustrated, in case that the ground L110 of the battery power input line is disposed above the circuit board 900, the chassis ground part 600 may be formed in the board fixing hole 910 formed at one side of a lower end of the circuit board 900 or the board fixing hole 913 formed at the other side of the lower end. In addition, the plurality of board fixing holes is spaced apart from the ground L110 of the battery power input line L100, the chassis ground part 600 may be formed in the board fixing hole 910 adjacent to the emergency operation signal line L300.

Figure 5:
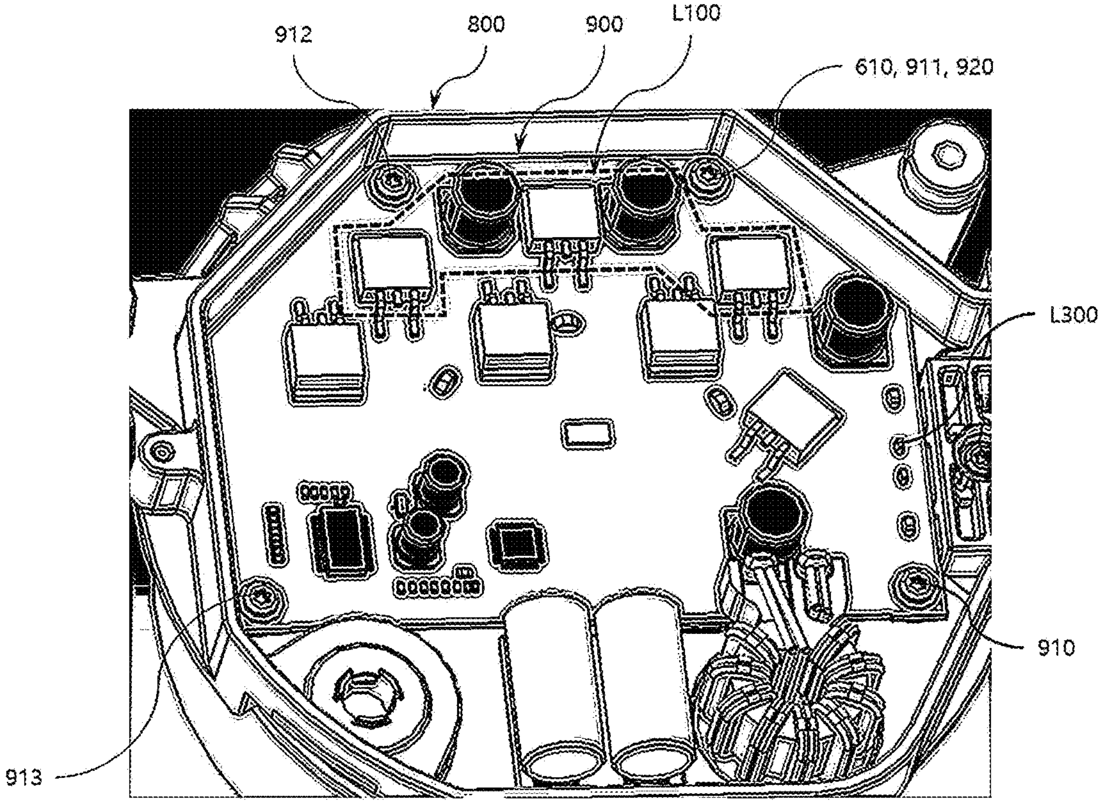
FIG. 5 is a top plan view of a circuit board of a motor controller according to a second embodiment of the present invention.

FIG. 5 is a top plan view illustrating a circuit board of a motor controller 1000 according to a second embodiment of the present invention.

As illustrated, the motor controller 1000 includes the plurality of board fixing holes 910, 911, 912, and 913 formed in the circuit board 900 to fix the circuit board 900 to the board fixing portion 810 (see FIG. 4) of the motor housing 800. In this case, the chassis ground part 610 may be formed in any one of the board fixing holes 911 and 912 adjacent to the battery power input line L100. When the screw bolt 920 penetrates the board fixing hole 911 and is fixed to the board fixing portion 810 of the motor housing 800, the battery power input line L100 may be grounded to the motor housing 800 through the screw bolt 920. Therefore, the screw bolt 920 is made of an electrically conductive material.

The technical spirit should not be construed as being limited to the embodiments of the present invention. Of course, the scope of application is diverse, and various modifications and implementations may be made by those skilled in the art without departing from the subject matter of the present invention claimed in the claims. Accordingly, these improvements and modifications will fall within the scope of the present invention as long as they are apparent to those skilled in the art.

The invention claimed is:

1. A BLDC motor controller for a vehicle cooling fan, the BLDC motor controller comprising:

a microcontroller unit configured to control a gate driver by receiving an operation signal through an operation signal line;

a gate driver configured to turn on or off a MOSFET in response to the operation signal of the microcontroller unit and supply an electric current for operating the motor;

the MOSFET configured to switch a drive current of the gate driver to the motor and transmit the drive current;

a battery power input line configured to transmit battery power to the microcontroller unit, the gate driver, and the MOSFET when a vehicle is turned on;

the operation signal line configured to transmit a motor operation signal, which is transmitted from an engine control unit of the vehicle, to the microcontroller unit; and an emergency operation signal line configured to operate the motor by transmitting an emergency operation signal directly to the gate driver when the motor operation signal is not transmitted to the microcontroller unit under a predetermined condition, wherein the ground of the battery power input line and the ground of the emergency operation signal line are separated from each other.

2. The BLDC motor controller of claim 1, comprising:

a circuit board; and a motor housing to which the circuit board is fixed, wherein the emergency operation signal line is grounded to the motor housing so as to have the ground separated from the ground of the battery power input line.

3. The BLDC motor controller of claim 2, wherein the circuit board has a chassis ground part for grounding the emergency operation signal line, and the chassis ground part is connected to the motor housing such that the emergency operation signal line is grounded to the motor housing.

4. The BLDC motor controller of claim 3, wherein the motor housing has a board fixing portion for fixing the circuit board by bolting, wherein the circuit board has a board fixing hole for fixing the motor housing by bolting, and wherein the chassis ground part is formed on a periphery of the board fixing hole, and the emergency operation signal line is grounded to the motor housing when a screw bolt made of an electrically conductive material penetrates the board fixing hole and is fixed to the board fixing portion.

5. The BLDC motor controller of claim 4, wherein the board fixing portion is provided as a plurality of board fixing portions spaced apart from one another, the board fixing hole is provided as a plurality of board fixing holes spaced apart from one another, and the chassis ground part is formed in the board fixing hole maximally spaced apart from the ground of the battery power input line among the board fixing holes.

6. The BLDC motor controller of claim 4, wherein the board fixing portion is provided as a plurality of board fixing portions spaced apart from one another, the board fixing hole is provided as a plurality of board fixing holes spaced apart from one another, and the chassis ground part is formed in the board fixing hole maximally adjacent to the emergency operation signal line among the plurality of board fixing holes spaced apart from the ground of the battery power input line at a predetermined distance or more among the board fixing holes.

7. The BLDC motor controller of claim 1, comprising:

a circuit board; and a motor housing to which the circuit board is fixed, wherein the battery power input line is grounded to the motor housing so as to have the ground separated from the ground of the emergency operation signal line.

8. The BLDC motor controller of claim 7, wherein the circuit board has a chassis ground part for grounding the battery power input line, and the chassis ground part is connected to the motor housing such that the battery power input line is grounded to the motor housing.

9. The BLDC motor controller of claim 8, wherein the motor housing has a board fixing portion for fixing the circuit board by bolting, wherein the circuit board has a board fixing hole for fixing the motor housing by bolting, and wherein the chassis ground part is formed on a periphery of the board fixing hole, and the battery power input line is grounded to the motor housing when a screw bolt made of an electrically conductive material penetrates the board fixing hole and is fixed to the board fixing portion.

* * * * *